United States Patent [19]

Yamashita

[11] Patent Number: 4,943,166
[45] Date of Patent: Jul. 24, 1990

[54] DEVICE FOR DETECTING THE POSITION OF AN OPTICAL HEAD

[75] Inventor: Hiroshi Yamashita, Kawasaki, Japan

[73] Assignee: Kabushiki Kaisha Toshiba, Kawasaki, Japan

[21] Appl. No.: 148,694

[22] Filed: Jan. 26, 1988

[30] Foreign Application Priority Data

Jan. 27, 1987 [JP] Japan .................................. 62-15136
Jan. 27, 1987 [JP] Japan .................................. 62-15138

[51] Int. Cl.$^5$ .............................................. G11B 7/18
[52] U.S. Cl. ..................................................... 369/32
[58] Field of Search ...................... 369/30, 32, 33, 44, 369/46, 112; 360/78.11, 77.03; 324/175; 250/732 SE, 237 G; 356/374

[56] References Cited

U.S. PATENT DOCUMENTS

| | | | |
|---|---|---|---|
| 3,646,261 | 2/1972 | Kinjo et al. | 360/78.11 |
| 3,737,883 | 6/1973 | Sordello et al. | 360/78.11 |
| 3,811,091 | 5/1974 | Ha et al. | 324/175 |
| 3,819,268 | 6/1974 | Johnson | 324/175 |
| 3,912,926 | 10/1975 | Coulbourn | 324/175 |
| 4,094,010 | 6/1978 | Pepperl et al. | 369/44 |
| 4,106,058 | 8/1978 | Romeas et al. | 369/112 |
| 4,135,086 | 1/1979 | Baba | 250/237 G |
| 4,481,613 | 11/1984 | Yokota | 369/32 |
| 4,524,397 | 6/1985 | Chalmers et al. | 360/77.03 |
| 4,583,212 | 4/1986 | Koide et al. | 369/219 |
| 4,695,720 | 9/1987 | Rieder et al. | 250/237 G |
| 4,717,824 | 1/1988 | Sakamoto et al. | 324/175 |

Primary Examiner—Donald McElheny, Jr.
Attorney, Agent, or Firm—Finnegan, Henderson, Farabow, Garrett, and Dunner

[57] ABSTRACT

A position-detecting device comprising a scale, a first photo-interrupter, and a second photo-interrupter. The scale is attached to a movable member, and has a plurality of slits arranged at regular intervals. Each photo-interrupter includes a light source and a light detector, which are located at opposing sides of said scale, respectively. The first and second photo-interrupters are spaced apart such that when the scale moves, they generate, respectively, a first signal and a second signal which have a phase difference of $\pi/2$. These signals are processed, thereby to determine the position of the movable member with high accuracy.

11 Claims, 6 Drawing Sheets

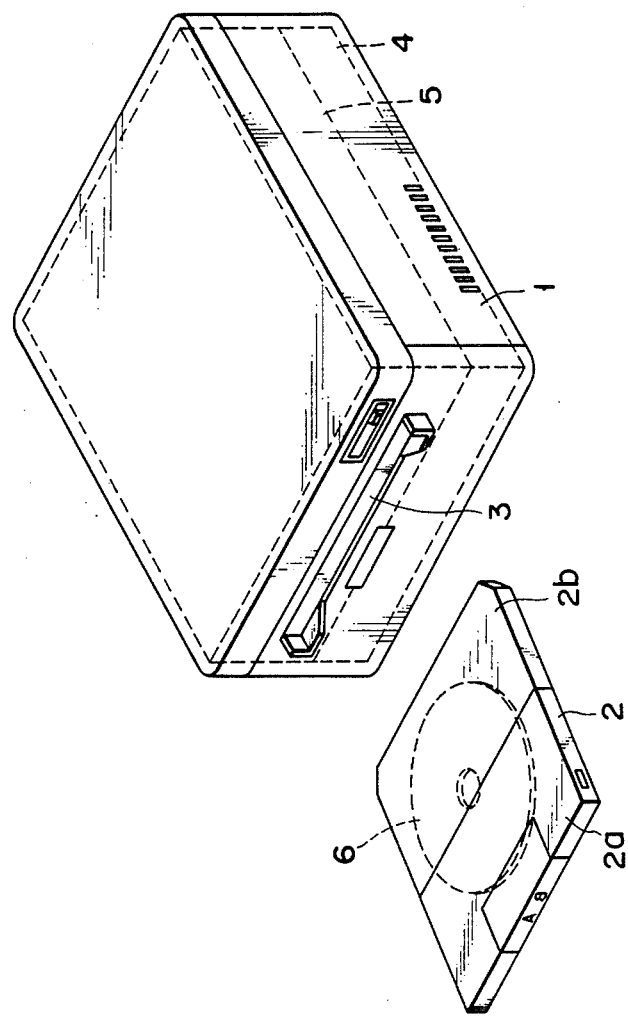
F I G. 1

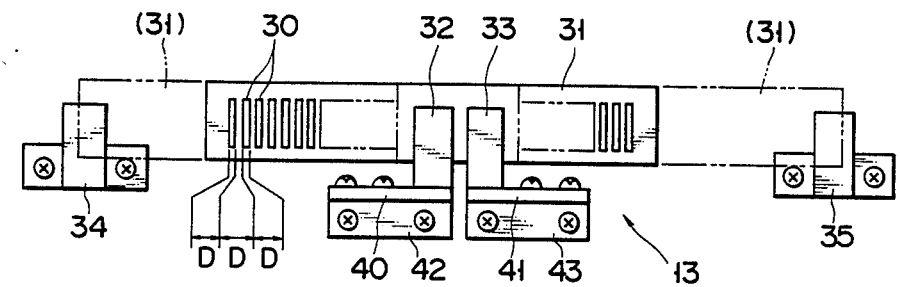
F I G. 3
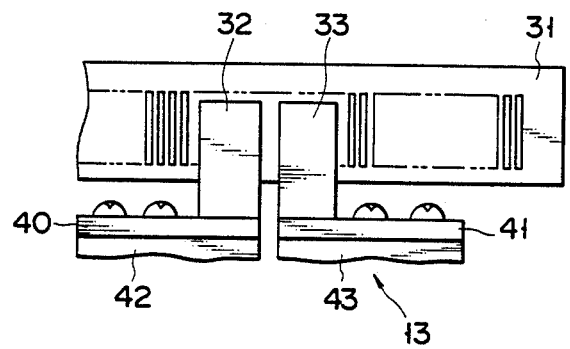
F I G. 4
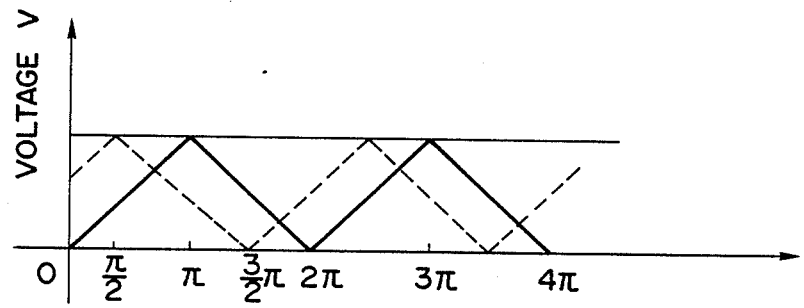
F I G. 5

DEVICE FOR DETECTING THE POSITION OF AN OPTICAL HEAD

BACKGROUND OF THE INVENTION

The present invention relates to a device for detecting the position of an optical head and, more particularly, it relates to an improvement of the device designed to detect the position of optical head which is driven linearly relative to an optical disk in the optical disk apparatus, and to direct the optical head to a predetermined track on the optical disk.

The optical disk has been developed as an information recording medium which information is optically recorded on or retrieved from. Various magnetic tapes are well known as the information magnetically-recording medium, but as compared these tapes, the optical disk can much further increase the information recording density on its recording area and provide much more stable recording condition without being influenced by any of matters such as the electric field applied from outside. Further, information is recorded on and retrieved from the optical disk by means of a light beam. Unlike a magnetic tape, the optical disk is not in contact with any other member while information is being written on it or read from it. Therefore, it is free from wearing. Furthermore, the information recorded on the optical disk can be retrieved as stable, low noise and high quality signals.

The information process apparatus provided with the optical disk needs an optical head for applying the light beam at the time of recording and retrieving information, a driver means for driving and positioning the optical head on a predetermined track on the optical head, and a device for detecting the position of the optical head relative to the optical disk.

An example of the conventional device for detecting the position of the optical head is disclosed in U.S.Pat. No. 4,607,956.

In the case of this device, a position detecting light source and a detector are opposed to each other on a fixed portion with a certain interval interposed between them, and an optical scale which moves together with the optical head is movably arranged between the light source and the detector. The optical scale has slits having a prescribed width and arranged at predetermined intervals. When the optical head is moved, the scale is also moved in the same way. As the scale is moved, the light beam applied from the light source passes through the slits, and is shut off by those portions of the scale where no slits are cut. The beam passing through each slit is detected by the detector. Hence, as the optical head is moved, the detector detects optical signals at time intervals corresponding to the intervals at which the slits are arranged. Zero signal and maximum value signal of these detected ones are counted by a counter and signals counted are processed to determine the position of the optical head and its change. In the case of this conventional device, however, the period of signals counted is determined and limited by the interval between the slits and the position detecting accuracy of the optical head cannot be therefore made higher than that allowed by the distance (or interval between the slits).

SUMMARY OF THE INVENTION

The object of the present invention is to provide a device which can detect the position of a movable object to the accuracy of a unit of length which is shorter than the interval between the slits cut in a scale fixed to the head.

According to the present invention, there can be provided a position-detecting device for detecting a position of a carrier movable in a predetermined direction comprising:

slit member movable with the carrier and having a plurality of slits which are arranged in the predetermined direction;

means for emitting first and second light beams so that said slit means are illuminated; and means for detecting the first and second light beams passing through the different slits of said slit member, respectively, to generate first and second signals in accordance with the movement of said slit means, the first and second signals having a phase difference of $\pi/2$.

BRIEF DESCRIPTION OF THE DRAWINGS

FIG. 1 is a perspective view showing an information processing apparatus into which a position detector device of the present invention has been incorporated, and also showing an information recording medium cartridge;

FIG. 3 is a plan showing an arrangement of the position detector device according to the present invention;

FIG. 4 is an enlarged view showing a part of the device shown in FIG. 3;

FIG. 5 is an explanatory view showing output signals detected by the position detector device;

DETAILED DESCRIPTION OF THE PREFERRED EMBODIMENT

Figure 2:
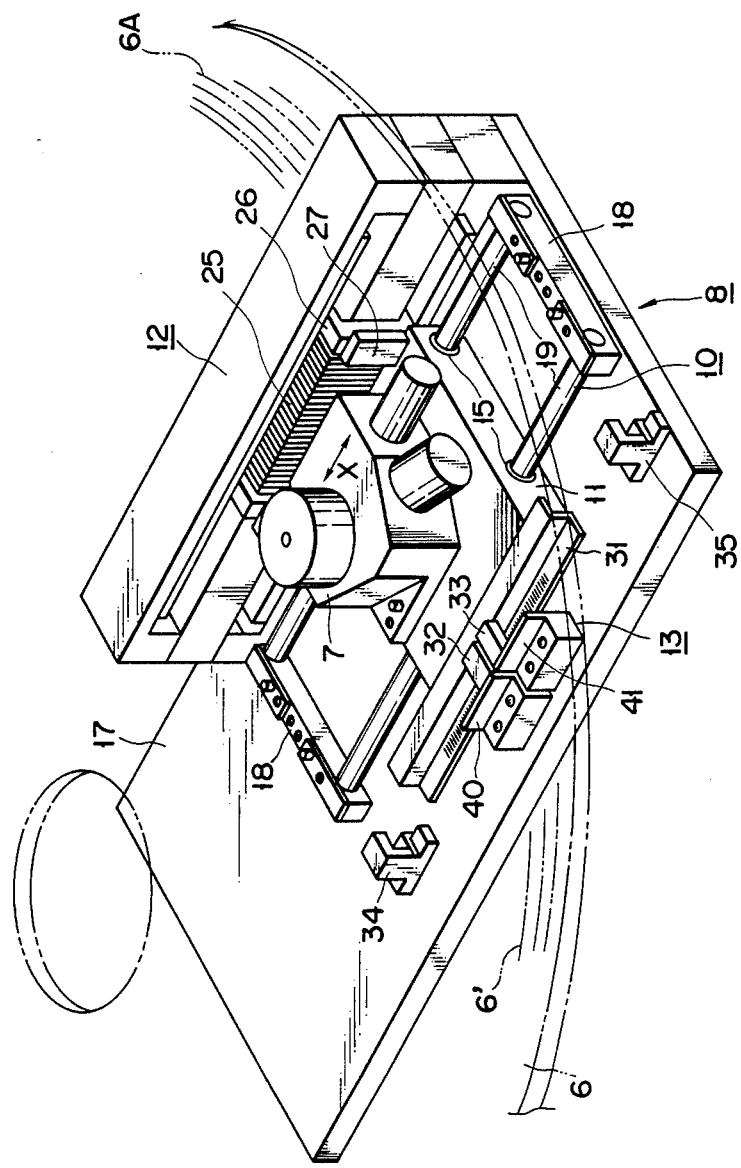
FIG. 2 is a perspective view showing an example of the position detector device of the present invention used to detect the position of an optical head mounted on a slider.

An embodiment of the present invention will be described with reference to the accompanying drawings.

FIG. 1 shows information processing apparatus 1 provided with a position detector device of the present invention, and information recording medium cartridge 2.

Information processing apparatus 1 comprises information processing mechanism 4, loading unit 5 and a control means (not shown) for driving them, and opening 3 for loading the cartridge in which an optical disk is housed is formed in the upper front of information processing apparatus 1.

Optical disk 6 which serves as the information recording medium is housed in cartridge 2. Cartridge 2 is inserted into information processing apparatus 1 through opening 3. Cartridge 2 thus inserted is automatically taken into a predetermined position, and positioned horizontally, cases 2A and 2B which forms cartridge 2 are opened, exposing the rotating center of optical disk 6 therein, and cartridge 2 is then shifted in the horizontal direction to dispose optical disk 6 on a turntable (not shown) in information processing mechanism 4.

Information processing mechanism 4 includes an optical disk driving mechanism such as a turntable, and optical head driving mechanism 8 shown in FIG. 2.

As is shown in FIG. 2, circular tracking guides 6A are formed in one surface of optical disk 6. These guides 6A, which are concentric to disk 6, define circular recording regions. Each guide 6A has pits representing a tracking number. Optical head 7 and driving mechanism 8 are provided under the recording surface of optical disk 6. Mechanism 8 so moves optical head 7 as to locate under tracking guide 6 whose tracking number has been designated, and then drives head 7, whereby optical head 7 applies a laser beam to tracking guide 6A, thus forming pits representing information in tracking guide 6A, or retrieving information from tracking guide 6A.

Optical head driving means 8 comprises slider 11 reciprocatably supported by guide means 10 which will be described later, optical head 7 mounted on slider 11, mechanism 12 for moving slider 11 to face a predetermined track on the recording surface of optical disk 6, and device 13 of the present invention for detecting the position of slider 11 provided with optical head 7 and moved by slider moving mechanism 12.

Guide means 10 comprises guide shafts 19 for supporting slider 11 movable, holder means mounted on base 17 to hold the guide shafts, and plural bearings 15 embedded in slider 11 to enable it to smoothly move on guide shafts 19.

Slider moving mechanism 12 comprises a linear motor. The motor comprises bobbin 26 and coil 25 wound around bobbin 26. Bobbin 26 coupled to slider 11 by arm 27. When current is supplied to coil 25 on the moving side of the linear motor, the slider is reciprocated in direction X, that is, in the radial direction of optical disk 6 as bobbin 26 moves.

Position detector device 13 which is employed by the present invention will be described in detail with reference to FIGS. 3 through 5.

As shown in FIGS. 3 and 4, scale 31 having a plurality of slits each having width D and being separated by equal interval D from its adjacent one is attached to the slider on which optical head 7 is mounted and which is to be detected, and this scale is moved as the slider moves. First and second U-shaped interrupters 32 and 33 are located substantially at the midpoint of the range of the movement of scale 31. Each interrupter has a light-emitting element (not shown) and a light-receiving element (not shown, either), which sandwich scale 31, one being positioned above scale 31 and the other being positioned below scale 31.

When slits are passed through first and second interrupters 32 and 33, light emitted from the light emitting elements is detected and when those portions of scale 31 where no slit is formed are passed through, light is shut off. When scale 31 begins to move in direction X and shifts to its constant-speed movement, slits 30 each having width D and formed in scale 31 periodically and repeatedly pass through photo-interrupters 32 and 33 at certain interval D. Therefore, signals (or voltage signals) detected by photo-interrupters 32 and 33 have voltage waveforms represented by the triangular or sine wave, as shown in FIG. 5. More specifically, each photo-interrupter generates a triangular-wave signal every time scale 31 moves by the distance equal to the interval at which slits 30 are arranged, whereby the light beam passes through one slit. This signal reaches its peak value when the axis of the light beam crosses the axis of the slit. Neither photo-interrupter generates a signal while the light beam is illuminating those portions of scale 31 where no slits are cut. In the case of this embodiment of the present invention, first and second photo-interrupters 32 and 33 are arranged to have a certain interval between them and make it possible that signals detected by one of them are shifted by $\pi/2$ in phase from those detected by the other. When the waveform obtained through first photo-interrupter 32 is illustrated by a solid line and the other waveform obtained through second photo-interrupter 33 by a broken line, for example, the two waveforms are shifted by $\pi/2$ in phase from each other, as shown in FIG. 5. Therefore, when the signals output from photo-interrupters 32 and 33 are appropriately processed, the position of optical head 7 can be detected to the accuracy of half the interval D. In other words, the device of this invention can detect the position of head 7 with an accuracy twice as high as the conventional position detector.

Third and fourth photo-interrupters 34 and 35 are also arranged at both ends of the moving passage of scale 31 and intended to define the movable range of scale 31 in the radial direction of optical disk 6. When the left end of scale 31 reaches third photo-interrupter 34, it comes into the path of the light beam emitted from the light emitting element of photo-interrupter 34, photo-interrupter 34 stops generating signals, whereby it is determined that scale 31 is at the leftmost position. Likewise, when the right end of scale 31 reaches fourth photo-interrupter 35, it shuts off the light beam emitted from the light emitting element of photo-interrupter 35, photo-interrupter 35 therefore stops generating signals, whereby it is determined that scale 31 is at the rightmost position.

Figure 6:
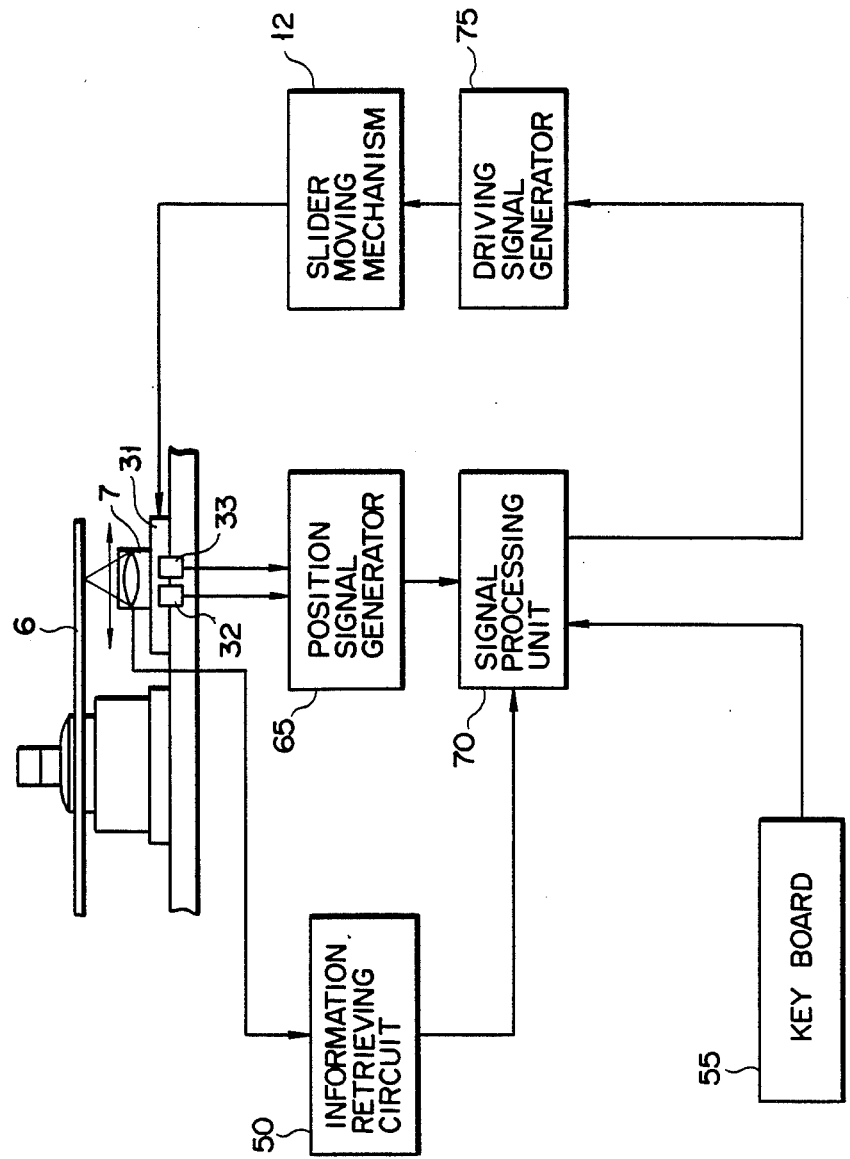
FIG. 6 is a block diagram showing a circuit for processing the output signals of the position detector deice.

The output detected by the photo-interrupters are processed by such a circuit as is shown in FIG. 6. The pits formed in each tracking guide 6A represent information, the track number of the tracking guide, and the sector numbers identifying the sector regions. A semiconductor laser (not shown) is incorporated in optical head 7. The laser emits a laser beam, which is converged by an objective lens onto one tracking guide 6A and reflected from the pits formed in said tracking guide. Optical head 7 receives the beam reflected from the pits, and converts this beam into an electric signal. This signal is input to information retrieving circuit 50 and is converted to an information signal. The information signal contains the address signal showing the number of tracking guide 6A. The address signal, which identifies the tracking guide being traced, represents the position of optical head 7. This signal is input to the CPU (not shown) provided within signal processing unit 70.

In the meantime, keyboard 55 is operated, thereby inputting a target address signal representing the number of a desired tracking guide 6A and the number of the desired sector of the tracking guide. The difference between the target address signal, showing the position to which head 7 should be moved, and the address signal input to unit 70 and showing the present position of optical head 7 represents the distance for which optical head 7 should be moved from the present position.

Signal processing unit 70 processes the target address signal and the address signal supplied from information retrieving circuit 50, thereby calculating the distance for which head 7 should be moved, and also the direction in which head 7 should be moved. A command signal representing the distance and the direction is input to driving signal generator 75. In accordance with this command signal, generator 75 generates an energizing signal and supplies this signal to slider moving mechanism 12. In response to the energizing signal, mechanism 12 drive the linear motor, thereby moving optical head 7 in the direction represented by the command signal. Photo-interrupters 32 and 33, both monitoring the movement of head 7, generates signals, which are supplied to position signal generator 65. Generator 65 converts the output signals of photo-interrupters 32 and 33 to position signals. More and more position signals are generated as optical head 7 is moved farther. Hence, the number of signals generated by photo-interrupters 32 and 33 is proportional to the distance the optical head has been moved. Signal processing unit 70 compares the distance represented by the number of the position signals with the distance for which head 7 should be moved. Unit 70 outputs a command signal which shows the difference between these compared distances. This command signal is supplied to driving signal generator 75. Generator 75 generates and supplies an energizing signal to slider moving mechanism 80. In accordance with the energizing signal, mechanism 80 drives the linear motor, such that optical head 7 is further moved to the desired tracking guide 6A.

Position signal generator 75 is of the same type as is disclosed in U.S. Pat. No. 4,607,956 and U.S. Pat. No. 4,481,613.

Figure 7:
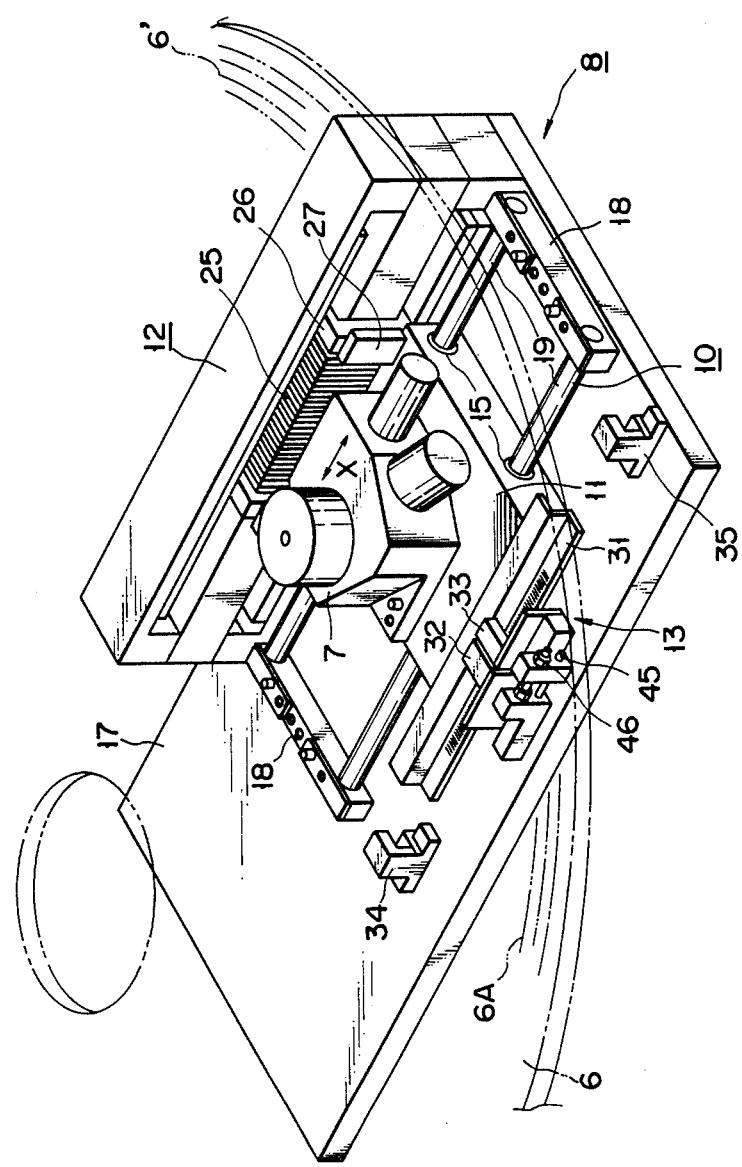
FIG. 7 is a perspective view showing another example of the position detector device of the present invention used to detect the position of the slider on which the optical head is mounted.
Figure 8:
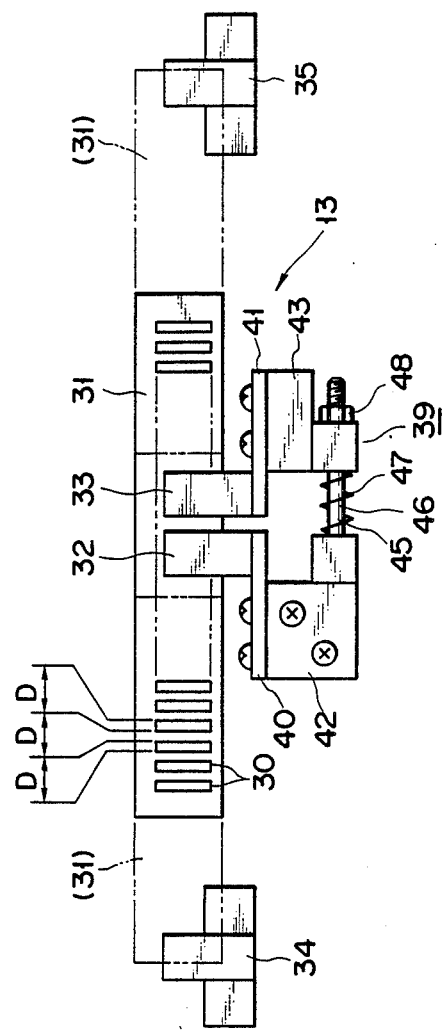
FIG. 8 is a plan showing an arrangement of the position detector device shown in FIG. 7.

Another embodiment of the present invention is shown in FIGS. 7 and 8.

In FIG. 8, first photo-interrupter 32 is fixed, while second photo-interrupter 33 is held movable by position adjusting means 39 for the purpose of adjusting the phase difference between signals detected by first and second photo-interrupters 32 and 33.

First and second photo-interrupters 32 and 33 are soldered to first and second base plates 40 and 41, respectively, and first base plate 40 is screwed to block 42 fixed on base 17, while second base plate 41 is screwed to movable block 43. Movable block 43 is slidably mounted two guide shafts 45 and 46 extending parallel to scale 31 from fixed block 42. The free end portion of shaft 46 is threaded, and nut 48 are mounted on this end portion in screw engagement therewith. Compression spring 47 is loosely mounted on the proximal portion of shaft 46, thus urging movable block 43 away from fixed block 42. Hence, block 43 is held at the position where it abuts against nut 48.

The movable block can be therefore fixed at an optional position by screwing nut 48 forward or backward on the guide shaft.

When the device has the above-described arrangement, the phase difference between signals detected by photo-interrupter 32 attached to the fixed portion and by photo-interrupter 33 attached to the movable portion can be adjusted to any optional value.

Although the second photo-interrupter has been held movable in this second embodiment, the first photo-interrupter may be arranged movable or both of them may be held movable.

Further, it should be understood that the present invention is not limited to the above-described embodiments but that various changes and modifications can be made without departing from the scope of the present invention.

According to the present invention as described above, the first and second photo-interrupters are spaced apart such that the first and second signals, have a phase difference of $\pi/2$ or a predetermined value. Therefore, when the signals output from photo-interrupters 32 and 33 are appropriately processed, the position of optical head 7 can be detected to the accuracy of half the interval D. In other words, the device of this invention can detect the position of head 7 with an accuracy twice as high as the conventional position detector. The phase difference between signals detected can be easily adjusted by holding one or plural photo-interrupters movable.

What is claimed is:

1. A position-detecting device for detecting a position of an optical head, the optical head having an optical axis and being mounted on a carrier movable in a predetermined direction perpendicular to the optical axis, comprising:

a fixed base;

a slit member movable with the carrier between a first position and a second position, the slit member having a first end and a second end opposite said first end and having a plurality of slits which are arranged in the predetermined direction;

emitting means, fixed on the base between the first and second positions, for emitting first and second light beams for illuminating the slit member;

first detecting means, fixed on the base, for detecting the first and second light beams passing through the slits of said slit member, to respectively generate first and second signals in accordance with the movement of said slit member, the first and second signals having a phase different of $\pi/2$ ; and second detecting means, fixed on the base, for detecting the first end of the slit member when the slit member is in the first position, and for detecting the second end of the slit member when the slit member is in the second position.

2. The device according to claim 1, wherein said emitting means and said first detecting means include first and second photo-interrupters which have first and second light sources for emitting the first and second light beams, respectively, and first and second photo-detectors for detecting the first and second light beams passing through the different slits.

3. The device according to claim 2, further comprising a means for adjusting the distance between said first and second photo-interrupters, thereby to change the phase difference between the first and second signals.

4. The device according to claim 2, wherein the second detecting means includes a third photo-interrupter and a fourth photo-interrupter respectively located at the ends of the range of the movement of said scale, each of said third and fourth photo-interrupters including a light source and a light detector and adapted to detect the end of said scale when the end of said scale moves into the gap between the light source and the light detector, the scale thereby blocking light emitted from the light source to the light detector.

5. The device according to claim 1, further comprising means for guiding said carrier.

6. An optical memory apparatus for retrieving information from an optical memory medium comprising:

a base;

a movable carrier;

means for moving the carrier across the optical memory medium in a predetermined direction;

optical means mounted on the movable carrier and having an optical axis perpendicular to the predetermined direction and movable with the carrier, for generating a light beam, converging the light beam onto the optical memory medium, and converting the light beam reflected from the optical memory medium into an information signal;

specifying means for specifying a desired target position to generate a target position signal; and position-detecting means for detecting a current position of the optical means, including;

a slit member movable with the carrier from a first position to a second position and having a first end and a second end opposite said first end and a plurality of slits arranged in said predetermined direction;

means, fixed on the base, for emitting first and second light beams to illuminate said slit member;

first detecting means for detecting the first and second light beam passing through the slits of said slit member to respectively generate first and second signals in accordance with the movement of said slit member, the first and second signals having a phase difference of $\pi/2$;

second detecting means, fixed on the base, for detecting the first end of the slit member when the slit member is in the first position and for detecting the second end of the slit member when the slit member is in the second position;

means for processing the first and second signals to generate a current position signal indicting the current position of the optical means;

position difference detecting means for detecting the position difference between the current position and the target position from the current position signal and the target position signal to generate a position difference signal; and driving means for energizing said linear motor in response to the position difference signal to cause said optical means to move to the target position.

7. The apparatus according to claim 6, wherein the optical memory medium has a track, and wherein track numbers indicating track positions on the track are recorded as information on the track of the optical memory medium and said specifying means includes;

means for generating a target track number signal denoting a target track number;

means for deriving a current track number signal indicating a current track number from the information signal, the track specified by the current track number being traced by the converged light beam generated from said optical means; and means for comparing the target track number signal with the current track number signal to generate the target position signal.

8. The apparatus according to claim 6, wherein said emitting means and detecting means include first and second photo-interrupters which have first and second light sources for emitting the first and second light beams, respectively, and first and second photo-detectors for detecting the first and second light beams passing through the different slits.

9. The apparatus according to claim 8, further comprising means for adjusting the distance between said first and second photo-interrupters, to thereby change the phase difference between the first and second signals.

10. The apparatus according to claim 8, further comprising a third photo-interrupter and a fourth photo-interrupter which are respectively located at the ends of the range of the movement of said scale, each of said third and fourth photo-interrupters including a light source and a light detector and adapted to detect the end of said scale when the end of said scale moves into the gap between the light source and the light detector, thus shutting off the light emitted from the light source to the light detector.

11. The apparatus according to claim 6, further comprising means for guiding said carrier.

* * * * *